(12) United States Patent
Zhang et al.

(10) Patent No.: US 11,727,245 B2
(45) Date of Patent: Aug. 15, 2023

(54) AUTOMATED MASKING OF CONFIDENTIAL INFORMATION IN UNSTRUCTURED COMPUTER TEXT USING ARTIFICIAL INTELLIGENCE

(71) Applicant: FMR LLC, Boston, MA (US)

(72) Inventors: Yu Zhang, Dalian (CN); Pu Li, Auburndale, MA (US); Hua Hao, Dalian (CN); Liang Chen, Dalian (CN); Dong Han, Dalian (CN)

(73) Assignee: FMR LLC, Boston, MA (US)

( * ) Notice: Subject to any disclaimer, the term of this patent is extended or adjusted under 35 U.S.C. 154(b) by 812 days.

(21) Appl. No.: 16/248,175

(22) Filed: Jan. 15, 2019

(65) Prior Publication Data

US 2020/0226288 A1 Jul. 16, 2020

(51) Int. Cl.
| | |
|---|---|
| *G06N 3/04* | (2023.01) |
| *G06F 21/62* | (2013.01) |
| *G06F 40/295* | (2020.01) |
| *G06F 40/30* | (2020.01) |
| *G06F 40/247* | (2020.01) |
| *G06N 3/02* | (2006.01) |

(52) U.S. Cl.
CPC .......... *G06N 3/04* (2013.01); *G06F 21/6254* (2013.01); *G06F 40/247* (2020.01); *G06F 40/295* (2020.01); *G06F 40/30* (2020.01); *G06F 2221/2125* (2013.01); *G06N 3/02* (2013.01)

(58) Field of Classification Search
CPC ... G06N 3/04; G06N 3/02; G06N 3/08; G06F 40/247; G06F 40/30; G06F 40/295; G06F 21/6254; G06F 2221/2125

USPC ......................................................... 706/15
See application file for complete search history.

(56) References Cited

U.S. PATENT DOCUMENTS 8,649,552 B2    2/2014   Balakrishnan et al.
8,856,119 B2 * 10/2014   Bhagwan .............. G06F 40/295
                                                                     707/736

(Continued)

OTHER PUBLICATIONS

Nathan Collier; Keep Text Messaging Secure; Mar. 2015; For the Record; pp. 1-2.*

(Continued)

*Primary Examiner* — Andrew R Dyer
(74) *Attorney, Agent, or Firm* — Cesari & McKenna, LLP (57) ABSTRACT

Methods and apparatuses are described for unstructured computer text is analyzed for masking of confidential information using artificial intelligence. A client device generates a message comprising unstructured computer text including confidential information. A server trains a word embedding model using the unstructured text. The server generates a multidimensional vector for each word in the unstructured text, generates a mapping table comprising a predetermined set of words corresponding to confidential information from the unstructured text, and determines one or more neighboring words in the trained word embedding model using the predetermined set of words. The server updates the mapping table to incorporate the one or more neighboring words and executes rules on the unstructured text that filter out one or more words, and applies the updated mapping table to match words in the updated mapping table with words in the filtered text and mask the matching words in the unstructured text.

14 Claims, 4 Drawing Sheets

(56) References Cited

U.S. PATENT DOCUMENTS

| | | | |
|---|---|---|---|
| 9,202,078 B2* | 12/2015 | Abuelsaad | G06F 16/116 |
| 9,910,902 B1* | 3/2018 | Kramer | G06Q 50/01 |
| 10,043,035 B2 | 8/2018 | LaFever et al. | |
| 10,169,315 B1* | 1/2019 | Heckel | G06N 3/0454 |
| 10,573,312 B1* | 2/2020 | Thomson | G10L 15/26 |
| 10,628,471 B2* | 4/2020 | Chandramouli | G06F 16/313 |
| 10,678,830 B2* | 6/2020 | Li | G06F 16/335 |
| 10,692,004 B1* | 6/2020 | Segev | G06Q 10/20 |
| 10,692,016 B2* | 6/2020 | Chandramouli | G06N 20/00 |
| 2009/0281974 A1 | 11/2009 | Saxena et al. | |
| 2013/0167192 A1 | 6/2013 | Hickman et al. | |
| 2015/0154193 A1* | 6/2015 | Dave | G06N 7/005 |
| | | | 707/748 |
| 2017/0262604 A1* | 9/2017 | Francois | G06Q 10/10 |
| 2017/0286398 A1* | 10/2017 | Hunt | G06F 40/30 |
| 2017/0372702 A1* | 12/2017 | Wang | G06F 16/00 |
| 2018/0159888 A1* | 6/2018 | Irimie | H04W 12/122 |
| 2018/0204111 A1* | 7/2018 | Zadeh | G06N 3/0436 |
| 2018/0293228 A1* | 10/2018 | Tarakji | G06F 40/157 |
| 2019/0171822 A1* | 6/2019 | Sjouwerman | G06F 30/20 |
| 2019/0272387 A1* | 9/2019 | Gkoulalas-Divanis | |
| | | | G06F 21/6254 |
| 2019/0354544 A1* | 11/2019 | Hertz | G06N 20/10 |
| 2019/0384820 A1* | 12/2019 | Liu | G06F 40/295 |
| 2020/0160975 A1* | 5/2020 | Yao | G16H 50/50 |
| 2020/0218940 A1* | 7/2020 | Anglin | G06K 9/6268 |
| 2020/0327252 A1* | 10/2020 | McFall | G06F 21/78 |

OTHER PUBLICATIONS

Neural Network Programming—Deep Learning PyTorch; Sep. 11, 2018; deeplizard.com; pp. 1-9.*

"Vector;" Microsoft Computer Dictionary; May 1, 2002; Microsoft Press, Fifth Edition; p. 548.*

T. Mikolov et al., "Efficient Estimation of Word Representations in VectorSpace," arXiv: 1301.3781 [cs.CL], submitted on Jan. 16, 2013, last revised Sep. 7, 2013, available at https://arxiv.org/abs/1301.3781, 12 pages.

Y. Goldberg and O. Levy, "word2vec Explained: Deriving Mikolov et al.'s Negative-Sampling Word-Embedding Method," arXiv: 1402.3722 [cs.CL], submitted on Feb. 15, 2014, available at https://arxiv.org/abs/1402.3722, 5 pages.

P. Bojanowski et al., "Enriching Word Vectors with Subword Information," arXiv: 1607.04606 [cs.CL], submitted on Jul. 15, 2016, last revised Jun. 19, 2017, available at https://arxiv.org/abs/1607.04606, 12 pages.

A. Joulin et al., "Bag of Tricks for Efficient Text Classification," arXiv: 1607.01759 [cs.CL], submitted on Jul. 6, 2016, last revised Aug. 9, 2016, available at https://arxiv.org/abs/1607.01759, 5 pages.

J. Pennington et al., "GloVe: Global Vectors for Word Representation," Proceedings of the 2014 Conference on Empirical Methods in Natural Language Processing (EMNLP), Oct. 25-29, 2014, pp. 1532-1543.

T. Mikolov et al., "Distributed Representations of Words and Phrases and their Compositionality," NIPS'13 Proceedings of the 26th International Conference on Neural Information Processing Systems, vol. 2, Dec. 2013, 9 pgs.

* cited by examiner

AUTOMATED MASKING OF CONFIDENTIAL INFORMATION IN UNSTRUCTURED COMPUTER TEXT USING ARTIFICIAL INTELLIGENCE

TECHNICAL FIELD

This application relates generally to methods and apparatuses, including computer program products, for automated masking of confidential information in unstructured computer text using artificial intelligence.

BACKGROUND

With the advent of computer-based communications, the concept of text can mean many different things, such as online surveys, feedback forms, chat dialog, social media interactions and conversations, and so forth. These types of unstructured computer text are present across all business domains in a variety of forms. Manual interpretation of such unstructured text to glean useful, business-actionable information is inefficient and time-consuming. Furthermore, such unstructured computer text often contains personal, sensitive or other confidential information of the user that submits the text, and organizations are typically restricted in how they must handle and protect this confidential information—for example, most (if not all) confidential information must be removed from unstructured computer text before the text can be analyzed for business intelligence and/or data mining purposes.

Existing computerized techniques for automatically masking confidential information contained in unstructured computer text, such as identifying the confidential information using a static dictionary and replacing the confidential information with special characters, have several significant technical deficiencies. First, such techniques usually render the text unusable for advanced data analytics because the text is degraded when confidential information is removed or masked and important context in the meaning of the text is lost. In addition, such techniques require substantial and time-consuming effort to maintain a dictionary of confidential information that can be used to identify similar information in incoming text—and many times the dictionary is incomplete or unable to identify confidential information that may be slightly different than what the system is expecting.

SUMMARY

Therefore, what is needed are methods and systems for intelligently masking confidential information in a large corpus of unstructured computer text, without compromising the confidential information but also enabling the unstructured text to undergo processes for data mining and business intelligence processing by ensuring that the context and meaning of the surrounding text is maintained. The techniques described herein provide the technical advantage of automatically curating a mapping of confidential words used for masking by exploring a high-dimensional space of word vectors to identify words with similar characteristics that are likely to also contain confidential information—thereby greatly improving the speed and efficiency of computerized data masking techniques. In addition, the methods and systems described herein enable seamless obfuscation of confidential information from unstructured computer text to alleviate concerns over data security and privacy, using advanced encryption mechanisms.

The invention, in one aspect, features a system used in a computing environment in which unstructured computer text is analyzed for masking of confidential information using artificial intelligence. The system comprises a client computing device that generates a message comprising a corpus of unstructured computer text, at least a portion of which comprises words, where one or more of the words corresponds to confidential information. The system comprises a computer data store that receives the corpus of unstructured computer text from the client computing device. The system comprises a server computing device in communication with the computer data store. The server computing device trains, using an artificial intelligence neural network executing on the server computing device, a word embedding model using the corpus of unstructured computer text. The server computing device generates a multidimensional vector for each word in the corpus of unstructured computer text by using the trained word embedding model, wherein each multidimensional vector is a point in a high-dimensional space of the trained word embedding model. The server computing device generates a mapping table comprising a predetermined set of words corresponding to confidential information from the corpus of unstructured computer text. The server computing device determines, using the trained word embedding model, one or more neighboring words in the trained word embedding model using the predetermined set of words in the mapping table. The server computing device updates the mapping table to incorporate the one or more neighboring words determined from the trained word embedding model. The server computing device executes one or more rules on the corpus of unstructured computer text that filter out one or more of the words in the corpus of unstructured computer text. The server computing device applies the updated mapping table to the filtered corpus of unstructured computer text to match one or more words in the updated mapping table with one or more words in the filtered corpus of unstructured computer text and mask the matching one or more words in the filtered corpus of unstructured computer text. The server computing device routes the message comprising the masked corpus of unstructured computer text to a remote computing device.

The invention, in another aspect, features a computerized method in which unstructured computer text is analyzed for masking of confidential information using artificial intelligence. A client computing device in communication with a computer data store generates a message comprising a corpus of unstructured computer text, at least a portion of which comprises words, where one or more of the words corresponds to confidential information. The computer data store receives the corpus of unstructured computer text from the client computing device. A server computing device in communication with the computer data store trains, using an artificial intelligence neural network executing on the server computing device, a word embedding model using the corpus of unstructured computer text. The server computing device generates a multidimensional vector for each word in the corpus of unstructured computer text by using the trained word embedding model, wherein each multidimensional vector is a point in a high-dimensional space of the trained word embedding model. The server computing device generates a mapping table comprising a predetermined set of words corresponding to confidential information from the corpus of unstructured computer text. The server computing device determines, using the trained word embedding model, one or more neighboring words in the trained word embedding model using the predetermined set of words in the mapping table. The server computing device updates the mapping table to incorporate the one or more neighboring words determined from the trained word embedding model. The server computing device executes one or more rules on the corpus of unstructured computer text that filter out one or more of the words in the corpus of unstructured computer text. The server computing device applies the updated mapping table to the filtered corpus of unstructured computer text to match one or more words in the updated mapping table with one or more words in the filtered corpus of unstructured computer text and mask the matching one or more words in the filtered corpus of unstructured computer text. The server computing device routes the message comprising the masked corpus of unstructured computer text to a remote computing device.

Any of the above aspects can include one or more of the following features. In some embodiments, the corpus of unstructured computer text is input into the computer data store via a web page, input directly into the computer data store via a first computer file, input into the computer data store via a data feed, or any combination thereof. In some embodiments, the artificial intelligence neural network that trains the word embedding model comprises a shallow neural network having an input layer, a hidden layer, and an output layer.

In some embodiments, determining one or more neighboring words in the trained word embedding model comprises identifying, for each word in the predetermined set of words in the mapping table, a first point in the trained word embedding model that corresponds to the word, determining one or more other points in the word embedding model that are in proximity to the first point based upon one or more similarity characteristics, and identifying the words associated with the determined one or more other points. In some embodiments, the one or more similarity characteristics comprise a word meaning. In some embodiments, executing one or more rules on the corpus of unstructured computer text comprises identifying one or more words in the corpus of unstructured computer text that have a structure that matches a predefined word structure contained in the one or more rules, and removing the identified one or more words from the corpus of unstructured computer text.

The invention, in another aspect, features a system in which unstructured computer text is analyzed for masking of confidential information. The system comprises a computer data store including a first corpus of unstructured computer text, at least a portion of which comprises a plurality of sentences of words, where one or more of the words corresponds to confidential information. The system comprises a server computing device in communication with the computer data store. The server computing device trains, using an artificial intelligence neural network executing on the server computing device, a word embedding model using the first corpus of unstructured computer text. The server computing device generates a multidimensional tensor for each sentence in the first corpus of unstructured computer text using the trained word embedding model, each word in the sentence comprising a vector of the multidimensional tensor. The server computing device determines a principal component analysis (PCA) matrix for the vectors in each multidimensional tensor. The system comprises a client computing device in communication with the server computing device that generates a message comprising a second corpus of unstructured computer text, at least a portion of which comprises a plurality of sentences of words, where one or more of the words corresponds to confidential information. The server computing device generates a multidimensional tensor for each sentence in the second corpus of unstructured computer text using the trained word embedding model executing on the server computing device, each word in the sentence comprising a vector of the multidimensional tensor. The server computing device encrypts each vector of each multidimensional tensor from the second corpus of unstructured computer text into a compression tensor using the PCA matrix. The server computing device routes the message comprising the encrypted second corpus of unstructured computer text to a remote computing device.

The invention, in another aspect, features a computerized method in which unstructured computer text is analyzed for masking of confidential information. A computer data store stores a first corpus of unstructured computer text, at least a portion of which comprises a plurality of sentences of words, where one or more of the words corresponds to confidential information. A server computing device in communication with the computer data store trains, using an artificial intelligence neural network executing on the server computing device, a word embedding model using the first corpus of unstructured computer text. The server computing device generates a multidimensional tensor for each sentence in the first corpus of unstructured computer text using the trained word embedding model, each word in the sentence comprising a vector of the multidimensional tensor. The server computing device determines a principal component analysis (PCA) matrix for the vectors in each multidimensional tensor. The system comprises a client computing device in communication with the server computing device that generates a message comprising a second corpus of unstructured computer text, at least a portion of which comprises a plurality of sentences of words, where one or more of the words corresponds to confidential information. The server computing device generates a multidimensional tensor for each sentence in the second corpus of unstructured computer text using the trained word embedding model executing on the server computing device, each word in the sentence comprising a vector of the multidimensional tensor. The server computing device encrypts each vector of each multidimensional tensor from the second corpus of unstructured computer text into a compression tensor using the PCA matrix. The server computing device routes the message comprising the encrypted second corpus of unstructured computer text to a remote computing device.

Any of the above aspects can include one or more of the following features. In some embodiments, the first corpus of unstructured computer text and the second corpus of unstructured computer text are input into the computer data store via a web page, input directly into the computer data store via a first computer file, input into the computer data store via a data feed, or any combination thereof. In some embodiments, the artificial intelligence neural network that trains the word embedding model comprises a shallow neural network having an input layer, a hidden layer, and an output layer.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
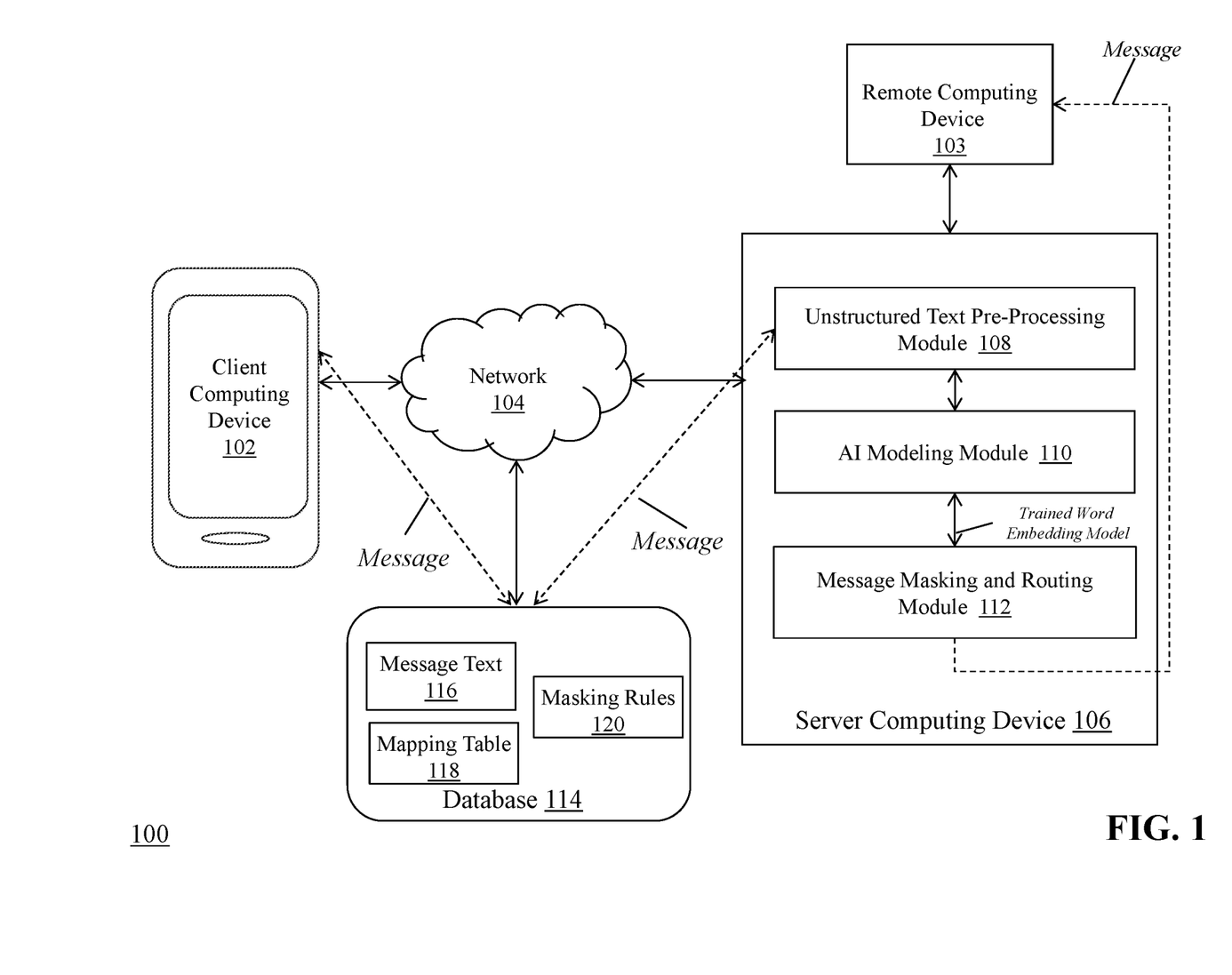
FIG. 1 is a block diagram of a system in which unstructured computer text is analyzed for masking of confidential information using artificial intelligence.

FIG. 1 is a block diagram of a system 100 in which unstructured computer text is analyzed for masking of confidential information using artificial intelligence. The system 100 includes a client computing device 102, a remote computing device 103, a communications network 104, a server computing device 106 that includes an unstructured text pre-processing module 108, an artificial intelligence (AI) modeling module 110, and a message masking and routing module 112, and a database 114 that includes message text 116, a mapping table 118, and masking rules 120.

The client computing device 102 connects to the communications network 104 in order to communicate with the server computing device 106 to provide input and receive output relating to the process of automated masking of confidential information in unstructured computer text using artificial intelligence as described herein. The client computing device 102 is coupled to a display device (not shown). For example, client computing device 102 can provide a graphical user interface (GUI) via the display device that presents output resulting from the methods and systems described herein.

Exemplary client computing devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client computing device 102, it should be appreciated that the system 100 can include any number of client computing devices.

The remote computing device 103 is a computing device coupled to the server computing device 106 and used to execute software applications in response to messages originating at the remote device 102. In one example, the remote computing device 103 is a workstation (e.g., desktop computer) of a customer service agent in a call center that enables the agent to receive messages, access information and perform actions using software on the remote computing device 103 to provide responses and/or solutions to messages submitted by the client computing device 102. The remote computing device 103 is capable of executing locally-stored software applications and also capable of accessing software applications delivered from the server computing device 106 (or other computing devices) via a cloud-based or software-as-a-service paradigm. The software applications can provide a wide spectrum of functionality (e.g., CRM, account, sales, inventory, ordering, information access, and the like) to the agent.

The communications network 104 enables the client computing device 102 to communicate with the server computing device 106. The network 104 is typically a wide area network, such as the Internet and/or a cellular network. In some embodiments, the network 104 is comprised of several discrete networks and/or sub-networks (e.g., cellular to Internet).

The server computing device 106 a device including specialized hardware and/or software modules that execute on a processor and interact with memory modules of the server computing device 106, to receive data from other components of the system 100, transmit data to other components of the system 100, and perform functions for automated masking of confidential information in unstructured computer text using artificial intelligence as described herein. The server computing device 106 includes several computing modules 108, 110, 112 that execute on the processor of the server computing device 106. In some embodiments, the modules 108, 110, 112 are specialized sets of computer software instructions programmed onto one or more dedicated processors in the server computing device 106 and can include specifically-designated memory locations and/or registers for executing the specialized computer software instructions.

Although the modules 108, 110, 112 are shown in FIG. 1 as executing within the same server computing device 106, in some embodiments the functionality of the modules 108, 110, 112 can be distributed among a plurality of server computing devices. As shown in FIG. 1, the server computing device 106 enables the modules 108, 110, 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112 is described in detail below.

The database 114 is a computing device (or in some embodiments, a set of computing devices) coupled to the server computing device 106 and is configured to receive, generate, and store specific segments of data relating to the process of automated masking of confidential information in unstructured computer text using artificial intelligence as described herein. In some embodiments, all or a portion of the database 114 can be integrated with the server computing device 106 or be located on a separate computing device or devices. The database 114 can comprise one or more databases configured to store portions of data used by the other components of the system 100, as will be described in greater detail below. An exemplary database 208 is MySQL™ available from Oracle Corp. of Redwood City, Calif.

The database 114 includes message text 114, a mapping table 116, and masking rules 120, each of which is a dedicated section of the database 114 that contains specialized data used by the other components of the system 110 to perform the automated masking of confidential information in unstructured computer text using artificial intelligence as described herein. Further detail on the message text 114, mapping table 116, and masking rules 120 is provided below.

Figure 2:
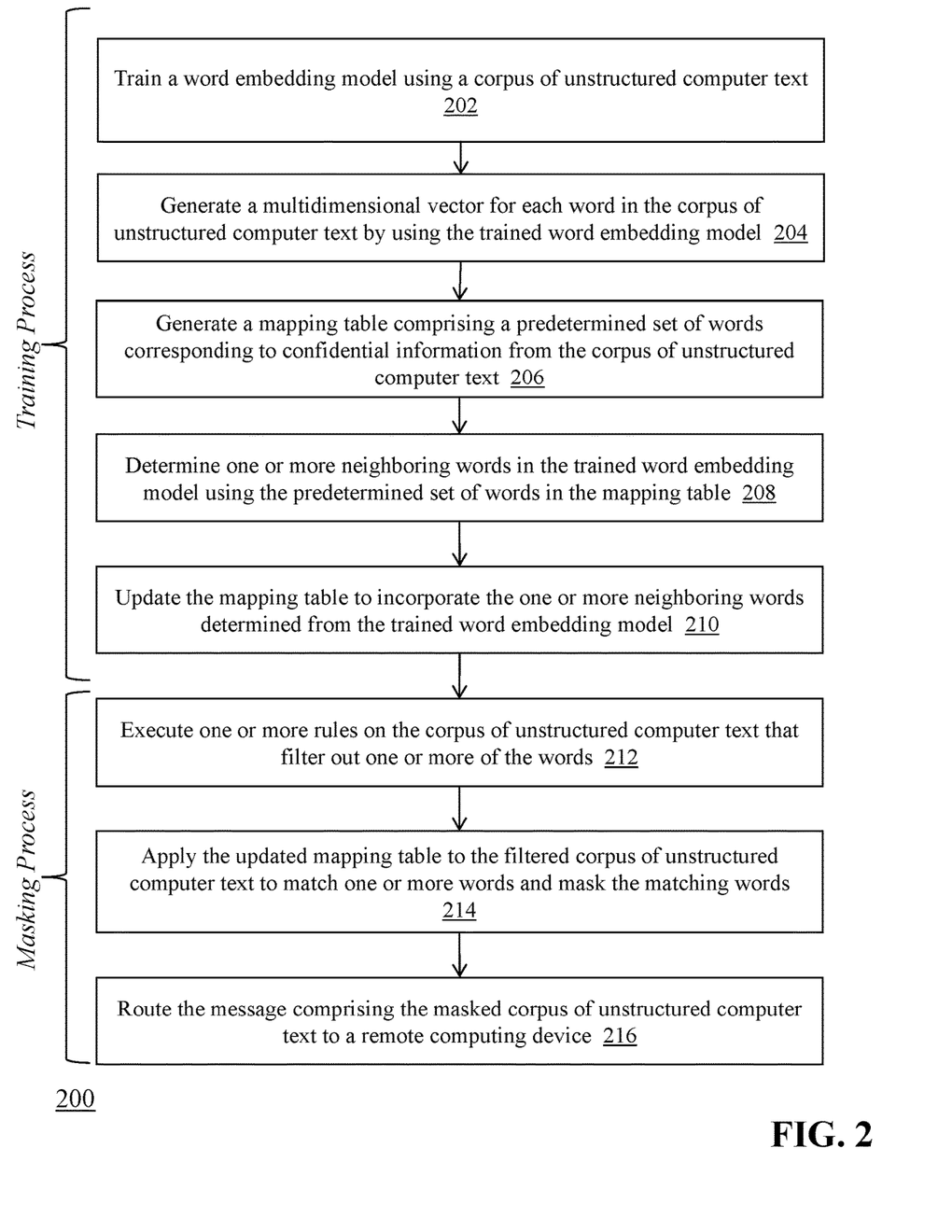
FIG. 2 is a flow diagram of a computerized method in which unstructured computer text is analyzed for masking of confidential information using artificial intelligence.

FIG. 2 is a flow diagram of a computerized method 200 in which unstructured computer text is analyzed for masking of confidential information using artificial intelligence, using the system 100 of FIG. 1. The first phase of the method 200 comprises a training process (i.e. steps 202-210), whereby the server computing device 106 generates and trains computer text classification models by applying artificial intelligence techniques to unstructured message text data 116 stored in the database 114, and the models are subsequently employed by the server computing device 106 in a masking process (i.e. steps 212-216) to apply masking rules to incoming unstructured computer text in a message received from client computing device 102 and route the message to, e.g., remote computing device 103 for action.

Figure 3:
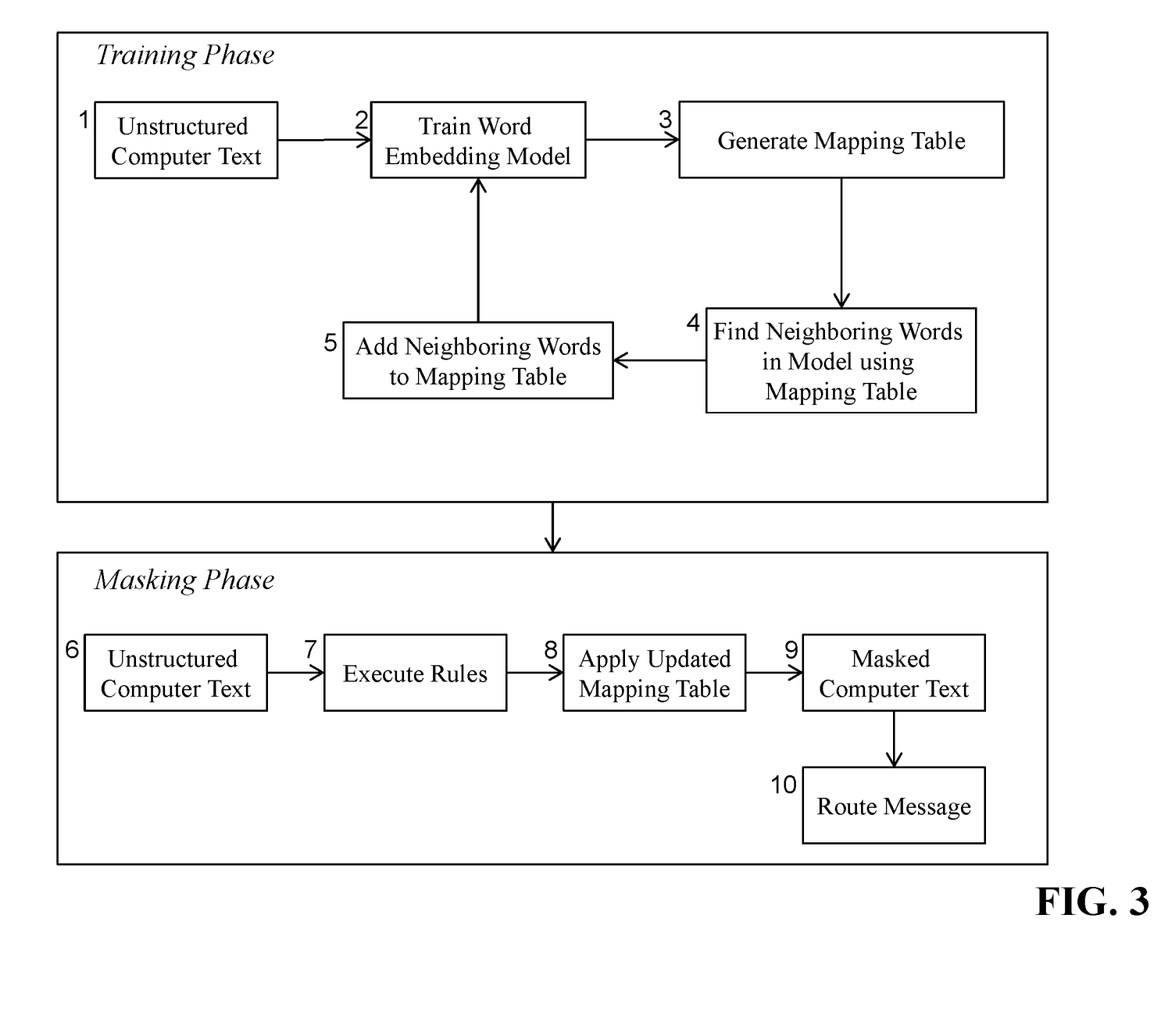
FIG. 3 is a detailed block diagram of the training process and the masking process as conducted by the modules of the server computing device.

FIG. 3 is a detailed block diagram of the training process and the masking process as conducted by the modules 108, 110, 112 of server computing device 106 shown in FIG. 1 and using the method 200 shown in FIG. 2. A user at client computing device 102 transmits a message containing unstructured computer text (e.g., chat message, email message, voice-to-text message, and the like) to the database 114, which stores the unstructured computer text in the message text 116 area. The training process starts when the unstructured text pre-processing module 108 receives the unstructured computer text data from the message text 116 of database 114. The unstructured computer text data comprises a corpus of text—namely one or more sentences made up of one or more words, spaces, punctuation, and other special characters—that a user of client device 102 entered and/or transmitted to the database 114 using software on the client device 102. Typically, the unstructured computer text in the message contains one or more sentences, each comprising one or more words—some of which may indicate confidential information, including fixed-pattern information (e.g., social security number (SSN), date of birth (DOB), phone number) and variable-pattern information (e.g., first name, last name).

The unstructured text pre-processing module 108 receives the message comprising the unstructured computer text from database 114 (step 1 in FIG. 3) and transmits the text to the AI modeling module 110, which trains (202) a word embedding model (i.e., based upon a shallow neural network comprising an input layer, a hidden layer, and an output layer) executing on the server computing device using the corpus of unstructured computer text (as received from module 108)—step 2 in FIG. 3. Generally, the word embedding model comprises a high-dimensional vector space with a plurality of points, each point comprising a vector that corresponds to a word from the corpus of unstructured computer text. The module 110 places each of the multidimensional word vectors into a vector space, so that word vectors for words that have similar characteristics (e.g., meaning) are closer to each other. Generally, the distance between word vectors in the high-dimensional vector space is determined using a distance measure (e.g., Euclidian or cosine), and thus word vectors for words that have similar characteristics are separated by a smaller distance measure. For example, patterns such as "Man:Woman::Brother:Sister" can be generated using the high-dimensional vector space through algebraic operations on the vector representations of these words—such that the vector representation of "Brother"—"Man"+"Woman" produces a result which is closest to the vector representation of "Sister" in the word embedding model. Therefore, it follows that the AI modeling module 110 places word vectors for words comprising confidential information (e.g., first name, last name, etc.) in the high-dimensional vector space closer to other word vectors that comprise similar confidential information—so that the module 110 can apply a predetermined distance measure to a word vector to locate neighboring word vectors for words that are likely also confidential—as will be explained below.

The unstructured text pre-processing module 108 generates (204) a multidimensional vector for each word in the unstructured computer text by using the trained word embedding model. In one embodiment, the module 108 uses word2vec [[(e.g., available from deeplearning4j.org/word2vec)]] to generate a multidimensional vector (comprising a plurality of numeric values) for each word in the corpus of unstructured computer text using the trained model. It should be appreciated that other types of word embedding models can be used within the scope of the invention. For example, a sentence can be, "Mr. White likes his cat." And for each word, the module 108 can convert the word into a vector with fixed size, such as, 'Mr.'→[0.5, 0.1, ..., 0.7], 'White'→[0.6, 0.7, ..., 0.2] and so on. It is worth noting that, these vectors are meaningful for deep learning. Then, the sentence "Mr. White likes his cat" is converted into a tensor, where in one embodiment, the column number is six—which is the same as the number of tokens of the sentence (full stop is also a token), and the row number is the same as word2vec vector size.

The AI modeling module 110 generates (206) a mapping table comprising a predetermined set of words corresponding to confidential information from the corpus of unstructured computer text—step 3 in FIG. 3. In some embodiments, the AI modeling module 110 can utilize a pre-stored dictionary of confidential words (e.g., stored in database 114) to analyze the words in the message text to determine whether any of the words correspond to confidential information. For example, if the pre-stored dictionary contains a number of common first names and last names, the module 110 can identify whether any of those names are contained in the corpus of unstructured computer text in the message. The module 110 generates the mapping table using the identified confidential words and stores the mapping table 118 in database 114.

Then, the AI modeling module 110 determines (208) one or more neighboring words in the trained word embedding model using the predetermined set of words in the mapping table—step 4 in FIG. 3. As explained above, the module 110 can traverse the vector space starting at the point (also called a node) corresponding to the word vector for each word in the mapping table to locate one or more word vectors in proximity to the starting word vector (i.e., based upon a predefined distance measure). These located word vectors are known as 'neighboring' word vectors. In some embodiments, the distance measure is defined to always identify at least one neighboring word vector for each starting word vector. The AI modeling module 110 updates (208) the mapping table to incorporate the words associated with the one or more neighboring word vectors determined from the word embedding model—step 5 of FIG. 3. In this way, the AI modeling module 110 automatically extends the mapping table to include additional words that have a high probability of comprising confidential information (based upon their proximity in the vector space to known confidential words). This technique provides a significant technical improvement in terms of data efficiency and speed of processing over existing techniques for identifying confidential information—which would typically require manual investigation of each word in a corpus of text and addition of such words to a mapping table. Additionally, as shown in FIG. 3, in some embodiments the word embedding model can be dynamically re-trained using the extended mapping table to provide more robust and accurate identification of confidential words. For example, in one embodiment, the original mapping table contains the top 2,000 popular names, such as "Jack", "Joshua," "Liam," etc., but some less common names such as "Austin" are not contained in the original mapping table—yet may be contained in the incoming corpus of text. After the system trains the word embedding model with the corpus of text, all the words in corpus are represented as a vector. Then, the module 110 can search the top three nearest neighbors of "Jack," "Joshua," "Liam," etc. to find that "Austin" is, e.g., the second nearest neighbor of "Liam" and is not contained in the original mapping table. So, the module 110 can extend the original mapping table with the name "Austin."

Once the AI modeling module 110 has generated the mapping table and updated the mapping table using the word embedding model as described above, the message masking and routing module 112 receives the corpus of unstructured computer text from the original message (step 6 in FIG. 3) and uses the updated mapping table to mask confidential information contained in the corpus of unstructured computer text and route the masked message to remote computing device 103. The module 112 executes (210) one or more rules (i.e., masking rules 120 stored in database 114) on the corpus of unstructured computer text from the message to filter out one or more of the words in the unstructured computer text—step 7 of FIG. 3. In some embodiments, the rules are configured to identify fixed-pattern words (e.g., social security number (SSN), date of birth (DOB), phone number) contained in the corpus of text and remove those words from the corpus (or otherwise obfuscating the words so that the original word is no longer able to be understood). For example, the module 112 can mask a person's first name in the corpus of text by replacing it with a generic identifier (e.g., 'FIRST NAME').

The message masking and routing module 112 then applies (214) the updated mapping table to the filtered corpus of unstructured computer text to match one or more words in the mapping table to one or more words in the filtered corpus of text, and mask the matching words—step 8 in FIG. 3. As described above, the message masking and routing module 112 identifies the words containing confidential information in the corpus of text using the mapping table and masks the identified words (i.e., by obfuscating the words so they cannot be understood)—thereby generating a corpus of masked unstructured computer text (step 9 in FIG. 3) that does not directly contain any confidential information, but the context of the message data is preserved and can still be analyzed to determine aspects like customer intent and other business intelligence goals. For example, there may be a sentence in the corpus of text: "Austin is on vacation." The module 112 identifies "Austin" as a name according to the updated mapping table, and the sentence is masked as, e.g., "[masked_name] is on vacation" where, in some embodiments, the tag [masked_name] is replaced with another, fake name according to a replacement strategy.

The message masking and routing module 112 routes (216) the masked message data to remote computing device 103 for further analysis and processing. In one example, an automated chat bot can use masked datasets to implement some further system requirements, such as a virtual agent that can provide answers to a customer's question based on a specific business domain, g a masked data set, without compromising the privacy or security of confidential information in the data set.

Another embodiment of the masking methods and systems described herein comprises a grey masking technique, where each word in a corpus of unstructured computer text (including any confidential information) is masked and encrypted so that the corpus of unstructured computer text can be transferred to, e.g., other computing systems for specific data analysis without compromising the confidential information. The system 100 of FIG. 1 can further be adapted to perform this function as described below.

Figure 4:
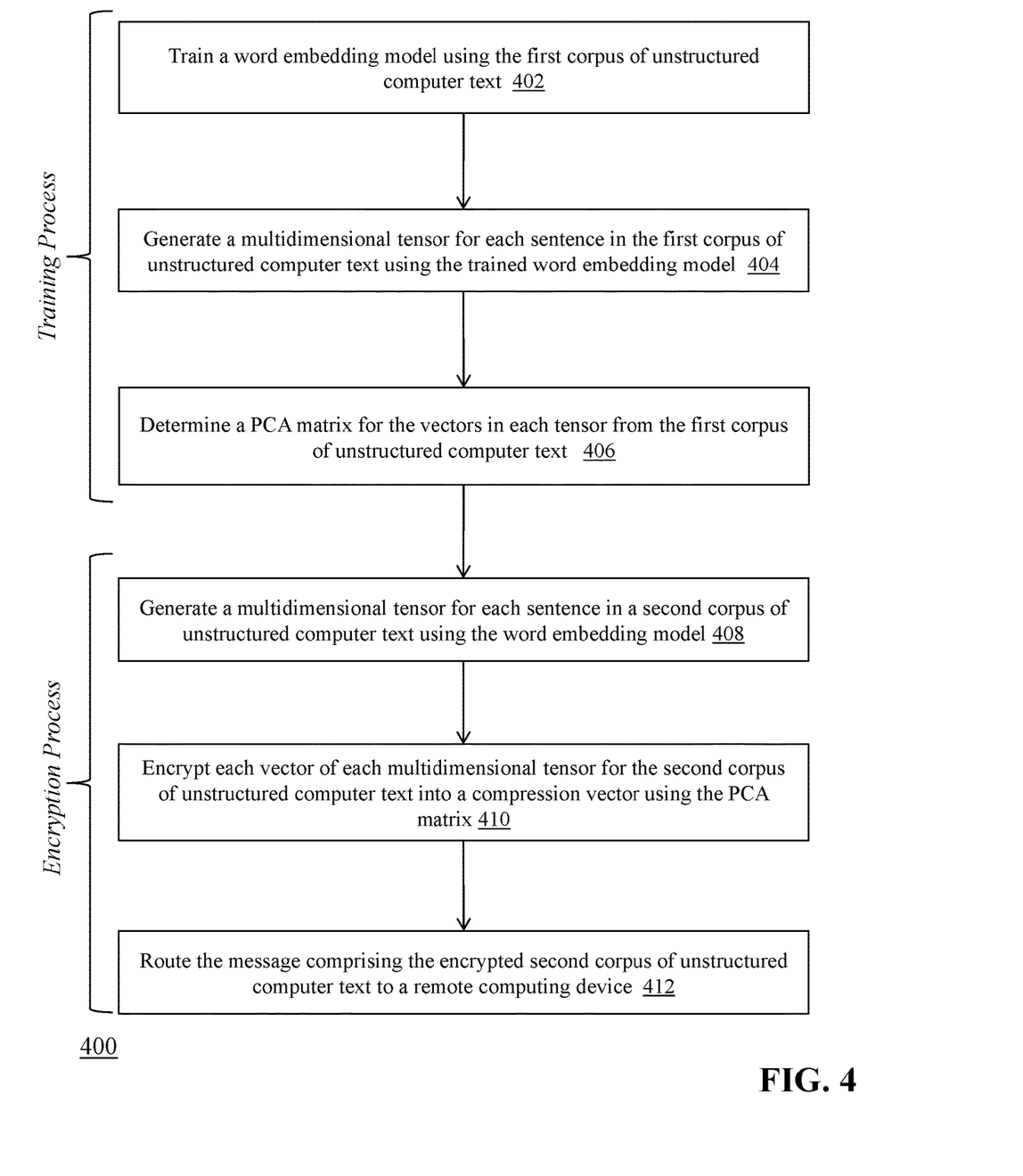
FIG. 4 is a flow diagram of a computerized method in which unstructured computer text is encrypted and masked using artificial intelligence.

FIG. 4 is a flow diagram of a computerized method in which unstructured computer text is encrypted and masked using artificial intelligence, using the system 100 of FIG. 1. A user at client computing device 102 transmits a message containing unstructured computer text (e.g., chat message, email message, voice-to-text message, and the like) to the database 114, which stores the unstructured computer text in the message text 116 area. The unstructured text pre-processing module 108 receives the unstructured computer text data from the message text 116 of database 114. As above, the unstructured computer text data comprises a corpus of text—namely one or more sentences made up of one or more words, spaces, punctuation, and other special characters—that a user of client device 102 entered and/or transmitted to the database 114 using software on the client device 102. Typically, the unstructured computer text in the message contains one or more sentences, each comprising one or more words—some of which may indicate confidential information, including fixed-pattern information (e.g., social security number (SSN), date of birth (DOB), phone number) and variable-pattern information (e.g., first name, last name).

The unstructured text pre-processing module 108 receives the message from database 114, and transmits the message to the AI modeling module 110, which trains (402) a word embedding model using the first corpus of unstructured computer text (as described previously with respect to FIG. 2). The unstructured text pre-processing module 108 generates (404) a multidimensional tensor for each sentence in the corpus of unstructured computer text using the trained word embedding model. In this context, a tensor is a plurality of vectors. In one embodiment, the module 108 uses word2vec (as described above) to create a multidimensional vector for each word in the corpus of unstructured computer text and then aggregates the vectors in each sentence into the tensor data structure.

Once the tensors are generated, the AI modeling module 110 receives the tensors and determines (406) a Principal Component Analysis (PCA) matrix for the vectors in each multidimensional tensor. Generally, Principal Component Analysis (PCA) is a statistical procedure using an orthogonal transformation to convert a set of observations of possibly correlated variables into a set of values of linearly uncorrelated variables—called principal components. The transformation is defined so that the first principal component has the largest possible variance (that is, accounts for as much of the variability in the data as possible), and each succeeding component in turn has the highest variance possible under the constraint that it is orthogonal to the preceding components. The resulting vectors are an uncorrelated orthogonal basis set. PCA is a dimension-reduction tool that can be used to reduce a large set of variables (e.g., the tensor for each sentence) to a small set that still contains most of the information in the large set. For example, a sentence can be converted to be a tensor with the size m*n, where m is the number of tokens and n is the number of word vector size. This tensor can further be converted into a tensor with the size of m*(n−k). it should be appreciated that some detailed information may be dropped, but this has little influence on training the model.

At first, the module 110 converts every sentence in the corpus of text into a multidimensional tensor. Then, the module 110 concatenates all the sentence tensors together as a corpus tensor. For example, there may be 1,000 sentences in the corpus of text. For each sentence, there may be ten tokens on average. And, the word vector size may be 300. In this case, the module 110 generates a 10,000*300 corpus tensor. The module 110 utilizes PCA to compress the 300 dimensions to 299—or even less, where the number of dimensions is based on, e.g., a parameter of PCA. This has little influence on the performance of training.

At the same time, the weight matrixes are recorded which are used for generating a new sentence tensor. Once the AI modeling module 110 has trained the encrypted word embedding model, the trained model can be used to classify subsequently-received corpuses of unstructured computer text—without compromising the integrity of the confidential information in the text, because the corpuses of text are encrypted prior to classification.

For example, the unstructured text pre-processing module 108 can receive another message containing unstructured computer text with confidential information from, e.g., client device 102 via database 114. The module 108 generates (408) a multidimensional tensor for each sentence in the second message using the word embedding model previously trained by the system 100. The AI modeling module 110 then encrypts (410) each vector of each multidimensional tensor for each sentence in the second message using the previously-generated PCA matrix, and routes (412) the second message comprising the encrypted corpus of unstructured computer text to remote computing device 103 for processing. For example, there may be a new sentence "Jack loves Rose." The system converts this sentence into a 300*4 tensor ST according to word2vec. And then, the system uses the trained PCA model to convert the new sentence tensor ST into the compressed sentence tensor CST where the shape should be 299*4. In one embodiment, the conversion process is CST=SVD*ST, where SVD is the product of PCA weight matrix.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method in which unstructured computer text is analyzed for masking of confidential information using artificial intelligence, the method comprising:

generating, by a first client computer in communication with a computer data store on a first server computer, a message comprising a corpus of unstructured computer text, at least a portion of which comprises words, wherein one or more of the words corresponds to confidential information;

receiving, by the computer data store, the corpus of unstructured computer text from the first client computer;

training, using an artificial intelligence neural network executing on a second server computer in communication with the computer data store on the first server computer, a word embedding model using the corpus of unstructured computer text;

generating, by the second server computer, a multidimensional vector for each word in the corpus of unstructured computer text by using the trained word embedding model, wherein each multidimensional vector is a point in a multidimensional space of the trained word embedding model;

identifying, by the second server computer, words from the corpus of unstructured computer text that match one or more words in a pre-stored confidential information dictionary and generating a mapping table comprising only the matched words;

determining, by the second server computer using the trained word embedding model, one or more neighboring words in the word embedding model using the words in the mapping table;

updating, by the second server computer, the mapping table to incorporate the one or more neighboring words determined from the trained word embedding model;

re-training, using the artificial intelligence neural network, the word embedding model using the updated mapping table;

executing, by the second server computer, one or more rules on the corpus of unstructured computer text to filter out one or more of the words in the corpus of unstructured computer text that have a fixed pattern of characters associated with confidential information and replace each of the filtered words with a generic identifier corresponding to a type of the filtered word;

applying, by the second server computer, the updated mapping table to the filtered corpus of unstructured computer text to match one or more words in the updated mapping table with one or more words in the filtered corpus of unstructured computer text and mask the matching one or more words in the filtered corpus of unstructured computer text by replacing each of the matched words with a generic identifier corresponding to a type of the matched word; and routing, by the second server computer, the message comprising the masked corpus of unstructured computer text to a second client computer that is remote from the second server computer.

2. The method of claim 1, wherein the corpus of unstructured computer text is input into the computer data store via a web page, input directly into the computer data store via a first computer file, input into the computer data store via a data feed, or any combination thereof.

3. The method of claim 1, wherein the artificial intelligence neural network that trains the word embedding model consists of a shallow neural network having an input layer, a hidden layer, and an output layer.

4. The method of claim 1, wherein determining one or more neighboring words in the trained word embedding model comprises:

identifying, for each word in the mapping table, a first point in the trained word embedding model that corresponds to the word;

determining one or more other points in the word embedding model that are within a predetermined distance from the first point based upon one or more similarity characteristics; and identifying the words associated with the determined one or more other points in the trained word embedding model.

5. The method of claim 4, wherein the one or more similarity characteristics comprise a word meaning.

6. The method of claim 1, wherein the fixed pattern of characters corresponds to a date of birth pattern, a social security number pattern, or a phone number pattern.

7. The method of claim 1, further comprising:
identifying, by the second client computer, a context associated with the filtered and masked corpus of unstructured computer text; and
generating, by the second client computer, a response to the filtered and masked corpus of unstructured computer text.

8. A system used in a computing environment in which unstructured computer text is analyzed for masking of confidential information using artificial intelligence, the system comprising:
a client computer comprising a memory for storing computer-executable instructions and a processor that executes the computer-executable instructions to generate a message comprising a corpus of unstructured computer text, at least a portion of which comprises words, wherein one or more of the words corresponds to confidential information;
a computer data store on a first server computer comprising a memory for storing computer-executable instructions and a processor that executes the computer-executable instructions to receive the corpus of unstructured computer text from the client computer;
a second server computer in communication with the computer data store on the first server computer, the second server computer comprising a memory for storing computer-executable instructions and a processor that executes the computer-executable instructions to:
train, using an artificial intelligence neural network executing on the second server computer, a word embedding model using the corpus of unstructured computer text;
generate a multidimensional vector for each word in the corpus of unstructured computer text by using the trained word embedding model, wherein each multidimensional vector is a point in a multidimensional space of the trained word embedding model;
identify words from the corpus of unstructured computer text that match one or more words in a pre-stored confidential information dictionary and generating a mapping table comprising only the matched words;
determine, using the trained word embedding model, one or more neighboring words in the word embedding model using the words in the mapping table;
update the mapping table to incorporate the one or more neighboring words determined from the trained word embedding model;
re-train, using the artificial intelligence neural network, the word embedding model using the updated mapping table;
execute one or more rules on the corpus of unstructured computer text to filter out one or more of the words in the corpus of unstructured computer text that have a fixed pattern of characters associated with confidential information and replace each of the filtered words with a generic identifier corresponding to a type of the filtered word;
apply the updated mapping table to the filtered corpus of unstructured computer text to match one or more words in the updated mapping table with one or more words in the filtered corpus of unstructured computer text and mask the matching one or more words in the filtered corpus of unstructured computer text by replacing each of the matched words with a generic identifier corresponding to a type of the matched word; and
route the message comprising the masked corpus of unstructured computer text to a second client computer remote from the second server computer.

9. The system of claim 8, wherein the corpus of unstructured computer text is input into the computer data store via a web page, input directly into the computer data store via a first computer file, input into the computer data store via a data feed, or any combination thereof.

10. The system of claim 8, wherein the artificial intelligence neural network that trains the word embedding model consists of a shallow neural network having an input layer, a hidden layer, and an output layer.

11. The system of claim 8, wherein determining one or more neighboring words in the trained word embedding model comprises:
identifying, for each word in the mapping table, a first point in the trained word embedding model that corresponds to the word;
determining one or more other points in the trained word embedding model that within a predetermined distance from the first point based upon one or more similarity characteristics; and
identifying the words associated with the determined one or more other points in the trained word embedding model.

12. The system of claim 11, wherein the one or more similarity characteristics comprise a word meaning.

13. The system of claim 8, wherein the fixed pattern of characters corresponds to a date of birth pattern, a social security number pattern, or a phone number pattern.

14. The system of claim 8, wherein the second client computer:
identifies a context associated with the filtered and masked corpus of unstructured computer text; and
generates a response to the filtered and masked corpus of unstructured computer text.

* * * * *